United States Patent [19]

Tanaka

[11] Patent Number: 5,182,788
[45] Date of Patent: Jan. 26, 1993

[54] OPTICAL BANDPASS FILTER HAVING A VARIABLE PASSBAND WAVELENGTH

[75] Inventor: Kazuhiro Tanaka, Kawasaki, Japan

[73] Assignee: Fujitsu Limited, Kawasaki, Japan

[21] Appl. No.: 854,535

[22] Filed: Mar. 19, 1992

[30] Foreign Application Priority Data

Mar. 20, 1991 [JP] Japan ................. 3-57425

[51] Int. Cl.$^5$ ................. G02B 6/10; H01S 3/30; H01L 27/12
[52] U.S. Cl. ................. 385/131; 385/14; 385/130; 372/7; 372/43; 372/50; 359/885; 359/890; 257/14
[58] Field of Search ................. 385/2–11, 385/14, 122, 131, 132, 141, 130; 372/7, 43, 44, 45, 46, 50, 96; 357/4, 16, 17, 19, 30, 71; 359/885, 890

[56] References Cited

U.S. PATENT DOCUMENTS

| | | | |
|---|---|---|---|
| 4,591,889 | 5/1986 | Gossard et al. | 357/4 |
| 4,716,449 | 12/1987 | Miller | 357/4 X |
| 4,751,194 | 6/1988 | Cibert et al. | 357/4 X |
| 4,755,015 | 7/1988 | Uno et al. | 385/14 |
| 4,843,032 | 6/1989 | Tokuda et al. | 372/45 X |
| 5,020,072 | 5/1991 | Abe et al. | 372/45 X |
| 5,032,877 | 7/1991 | Bate | 357/4 X |
| 5,126,804 | 6/1992 | Nagai et al. | 357/4 X |
| 5,128,728 | 7/1992 | Liu | 357/4 |

Primary Examiner—Brian Healy
Attorney, Agent, or Firm—Staas & Halsey

[57] ABSTRACT

An optical bandpass filter comprises a waveguide region for guiding an optical beam from an input end to an output end, a clad structure provided above and below the waveguide region for confining the optical beam therein, a plurality of quantum well boxes formed in the waveguide region with respectively different quantum levels for selectively absorbing an optical component in the incident optical beam that causes a resonant absorption with the quantum level of the quantum well box, a barrier region provided in the waveguide region for surrounding each of the plurality of quantum well boxes with respect to all of three-dimensional directions and comprising a material having a second band gap that is substantially larger than said first band gap, and window means provided on the clad structure for directing a control optical beam such that the control optical beam irradiates the plurality of quantum well boxes.

9 Claims, 7 Drawing Sheets

FIG.(C)

FIG. 5
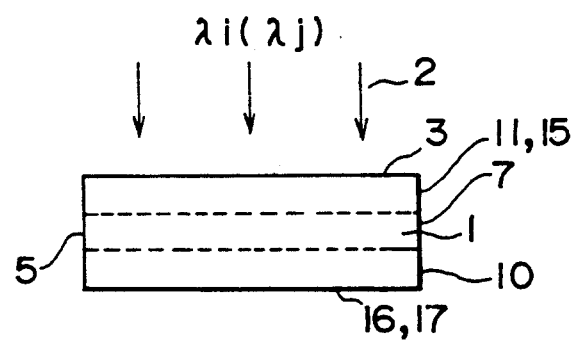
FIG. 6(A)  FIG. 6(B)
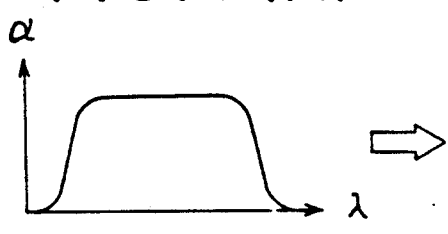 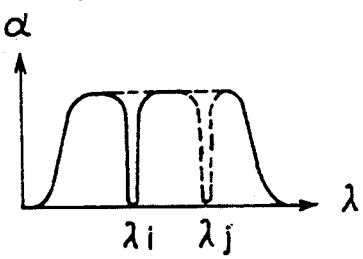
FIG. 7
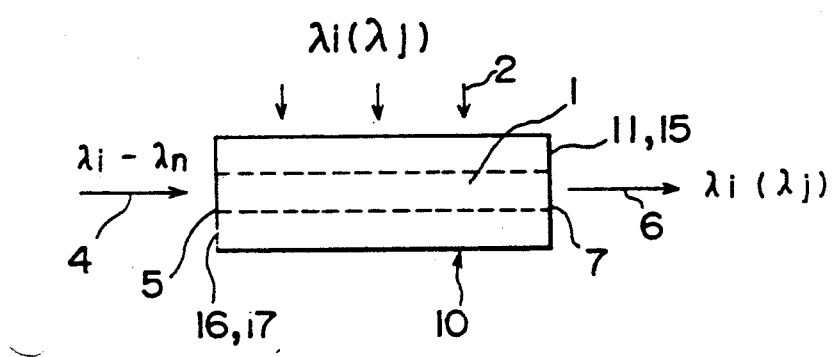

OPTICAL BANDPASS FILTER HAVING A VARIABLE PASSBAND WAVELENGTH

BACKGROUND OF THE INVENTION

The present invention generally relates to optical semiconductor devices, and more particularly to a semiconductor optical bandpass filter that selectively passes an optical beam of a specified wavelength.

Various optical elements are needed in the optical telecommunication systems such as laser diodes, photodetectors and optical filters. Among others, the optical filters are the essential elements in the large capacity optical telecommunication network that employs the technique of wavelength multiplexing. In the wavelength multiplex network, a large number of information signals are multiplexed on a single optical fiber by changing the frequency and hence the wavelength of the optical carrier for each optical channel. In such a system, a very large number of optical filters, each having its own passband and a central passband wavelength, are needed in order to demultiplex the optical signals or to switch the connection of the optical channels.

Conventionally, the optical filters for use in the optical telecommunication network have been formed based upon a multi-layer mirror or a Fabry-Perot resonator. In such conventional filters, the passband wavelength has been determined by the construction of the filter such as the geometrical dimension or the composition of the material. Thereby, one has to provide a large number of filters in correspondence to the signal channels of the telecommunication system, together with a distribution network for distributing the optical signals to each of these filters. When the number of the optical channels is increased, such a construction becomes inevitably bulky and expensive.

SUMMARY OF THE INVENTION

Accordingly, it is a general object of the present invention to provide a novel and useful optical bandpass filter, wherein the foregoing problems are eliminated.

Another and more specific object of the present invention is to provide an optical bandpass filter that is capable of changing the passband such that an optical beam of a specified wavelength is selectively passed through the optical bandpass filter.

Another object of the present invention is to provide an optical bandpass filter supplied with an incident optical beam including therein a plurality of optical components with respective wavelengths that differ from each other, for selectively passing a specified optical component having a specified wavelength, comprising a waveguide region for guiding an incident optical beam, a plurality of quantum well boxes formed in the waveguide region with respectively different absorption wavelengths for absorbing each optical component of the incident optical beam, and a window provided on the waveguide region for directing a control optical beam such that the control optical beam irradiates the plurality of quantum well boxes.

According to the present invention, one can selectively saturate the absorption of the quantum well box by irradiating the control optical beam with a wavelength coincident to the wavelength of the specified optical component. As a result of the saturation in the absorption of the quantum well boxes, the specified optical component is passed to an output end of the waveguide region without experiencing substantial absorption. By changing the wavelength of the control optical beam, one can cause the saturation of another quantum well box. Thus, by controlling the wavelength of the control optical beam, the passage of any desired optical component having any desired wavelength is obtained.

Other objects and further features of the present invention will become apparent from the following detailed description when read in conjunction with the attached drawing.

BRIEF DESCRIPTION OF THE DRAWINGS

FIGS. 3(A)–3(C) are diagrams showing the optical absorption achieved by various quantum semiconductor structures including the quantum well, the quantum well wire and the quantum well box;

FIG. 5 is a diagram showing the irradiation of a control optical beam on the optical bandpass filter of FIG. 1;

FIGS. 6(A) and 6(B) are diagrams respectively showing the absorption spectrum before and after the irradiation of a control optical beam;

FIG. 7 is a diagram showing the passage of the optical beam of a specified wavelength through the optical bandpass filter of FIG. 1;

DETAILED DESCRIPTION OF THE PREFERRED EMBODIMENTS

Figure 1:
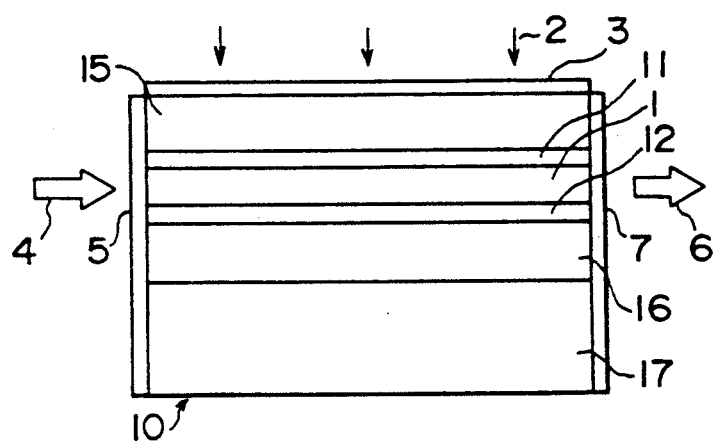
FIG. 1 is a diagram showing the fundamental structure of the optical bandpass filter according to a first embodiment of the present invention.

FIG. 1 shows the fundamental construction of the optical bandpass filter according to a first embodiment.

Referring to FIG. 1, the optical bandpass filter is constructed based upon a layered semiconductor body 10 that includes a substrate 17 of semi-insulating InP. On the substrate 17, a clad layer 16 of undoped InP is provided with a thickness of about 1 $\mu$m, and a first optical confinement layer 12 of undoped InGaAsP is provided on the clad layer 16 with a thickness of 50 nm. Typically, the optical confinement layer 12 has a composition corresponding to a bandgap wavelength of 1.15 $\mu$m or less.

On the first optical confinement layer 12, an active structure 1 that plays a key role of the optical-band pass filter of the present invention is provided with a thickness of 200 nm as will be described in detail below, and a second optical confinement layer 11 of undoped InGaAsP is provided on the active structure 1 with a thickness of 50 nm and a composition substantially identical with the composition of the layer 12. Further, a second clad layer 15 of undoped InP is provided on the optical confinement layer 11 with a thickness of 2 $\mu$m.

The layered body 10 thus formed extends between an input end to which an incident optical beam 4 is directed and an output end from which an output optical beam 6 exits, wherein anti-reflection films 5 and 7 are provided respectively on the input end and on the output end of the layered body as illustrated. Further, another anti-reflection film 3 is provided on the upper major surface of the second clad layer 15.

Figure 2:
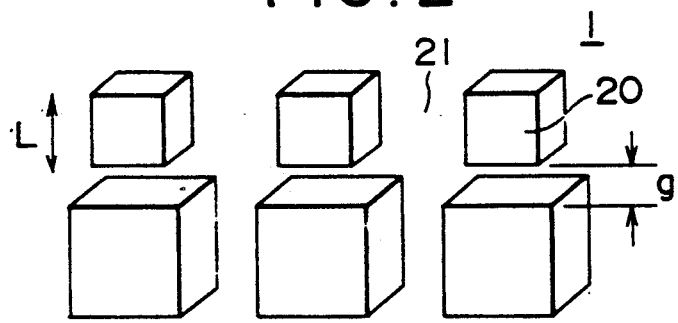
FIG. 2 is a diagram showing the quantum well box formed in the device of FIG. 1.

FIG. 2 shows the active structure 1 in detail.

Referring to FIG. 2, the active structure 1 includes therein a number of mutually isolated regions 20 of undoped InGaAs having a reduced band gap and a barrier region 21 of undoped InGaAsP having a larger band gap. Typically the region 20 has a composition of $In_{0.53}Ga_{0.47}As$ such that a lattice matching is achieved with the InP substrate 17. The barrier region 21 has a composition of $In_{0.81}Ga_{0.19}As_{0.4}P_{0.6}$ that establishes a lattice matching with InP and has a band gap energy corresponding to the wavelength of 1.15 μm.

It should be noted that the barrier region 21 fills the space between the isolated regions 20 and acts as the potential barrier. Thereby, each isolated region 20 is confined in the three-dimensional space and forms a quantum well box characterized by discrete quantum levels of electrons and holes. From this reason, the region 20 will be referred to hereinafter as a quantum well box. In the present invention, the size L of the quantum well box 20 is changed in the active structure 1 typically in the range between 15 nm and 25 nm. In other words, there are a number of quantum well boxes 20 in the active structure 1 with respective sizes L that differ with each other. In correspondence to this change of the size L, the size of the barrier region 21 designated as g in FIG. 2 changes between 15 and 25 nm. The size of the barrier region must be large enough to separate the quantum well boxes electronically from each other.

Figure 3A:
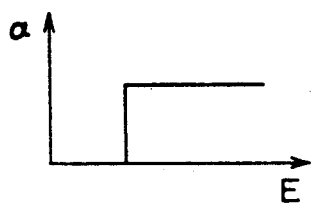
Figure 3B:
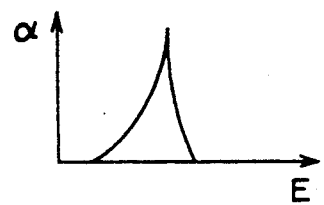

FIGS. 3(A)–3(C) show the absorption spectrum of typical quantum structures realized by the semiconductor materials, wherein FIG. 3(A) shows the absorption spectrum of a two-dimensional quantum well layer, FIG. 3(B) shows the absorption spectrum of a one-dimensional quantum well line, and FIG. 3(C) shows the absorption spectrum of a zero-dimensional quantum well box. As can be seen in these drawings, the quantum well box shows a sharp absorption peak in correspondence to an energy that in turn is determined by the size L of the quantum well box. On the other hand, the quantum well or quantum well wire inevitably shows a spreading of the absorption spectrum as can be seen from FIGS. 3(A) and 3(B). It should be noted that the quantum well boxes having the size of $L_x$, $L_y$ and $L_z$ in the x- y- and z-directions show the discrete quantum levels $E_{lmn}$ given approximately by:

$$E_{lmn} = h^2/2m^* \cdot (l\pi/L_x)^2 + h^2/2m^* \cdot (m\pi/L_y)^2 + h^2/2m^* \cdot (n\pi/L_z)^2$$

where l, m and n represent the quantum number and m* represents the effective mass of the carriers.

Figure 4:
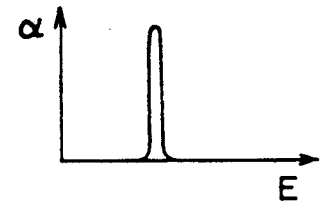
FIG. 4 is a diagram showing the absorption spectrum achieved by the device of FIG. 1.
Figure 4:
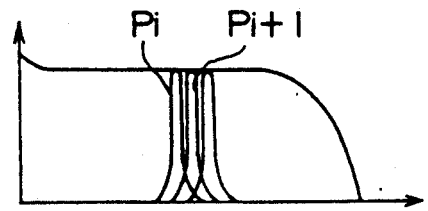

As there are a number of quantum boxes of which size is different from each other, it will be understood that the active region 1 as a whole shows an absorption spectrum as shown in FIG. 4 as a superposition of the absorption peaks of FIG. 3(C).

Next, the operation of the optical bandpass filter of FIG. 1 will be described with reference to FIG. 5.

In operation, a control optical beam 2 having a wavelength $\lambda_i$ is irradiated upon the active structure 1 via the anti-reflection coating 3 and the clad layer 15 as well as through the optical confinement layer 11, wherein the wavelength $\lambda_i$ is selected to be coincident with the wavelength of the optical beam that is to be passed through the optical bandpass filter. Upon the irradiation, the control optical beam causes an excitation of the electrons and holes in the quantum well box that has the quantum level coincident with the optical wavelength $\lambda_i$. When the control optical beam 2 is sufficiently strong, a saturation occurs in the quantum well box such that no further absorption of the optical beam of the same optical wavelength $\lambda_i$ occurs In other words, the active region becomes transparent with respect to the optical beam having the wavelength $\lambda_i$.

FIG. 6(A) shows the absorption spectrum of the active region 1 before the irradiation of the control optical beam, while FIG. 6(B) shows the absorption spectrum after the irradiation of the control optical beam. It will be noted that the spectrum of FIG. 6(A) is substantially identical with the spectrum of FIG. 4, while a dip of the absorption occurs in the spectrum of FIG. 6(B) in correspondence to the wavelength $\lambda_i$.

In this state, an optical beam that contains a number of optical components with respective wavelengths $\lambda_l$-$\lambda_n$ are irradiated into the active region 1 via the anti-reflection coating 5. Thereby, only the component having the wavelength $\lambda_i$ passes through the active structure 1. In other words, the device of FIG. 1 acts as the optical bandpass filter. It should be noted that the barrier region 21 formed between the quantum well boxes does not cause the absorption of the optical beam, as the band gap of the barrier region 21 is much larger than the energy of the optical beam that is processed by the optical bandpass filter. BY changing the wavelength $\lambda_i$, one can of course change the wavelength of the optical beam that is passed through the optical bandpass filter.

It should be noted that the passband of the optical bandpass filter is not limited to one, but the device of FIG. 1 can pass a number of optical beams having different wavelengths simultaneously. In this case, the control optical beam 2 that contains therein a number of optical components with respective wavelengths ($\lambda_i$, $\lambda_j$) are used. See FIG. 6(B).

Next, the fabrication process of the optical bandpass filter of FIG. 1 will be described with reference to FIGS. 8(A)–8(D).

Figure 8A:
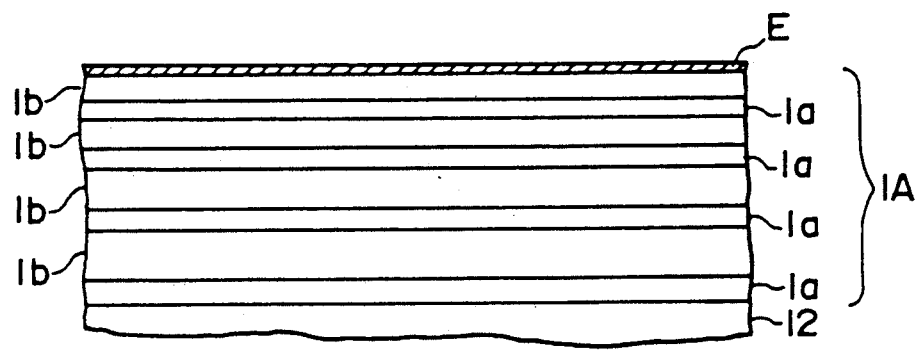
FIGS. 8(A)–8(D) are diagrams showing the process for fabricating the device of FIG. 1.

First, the layered body 10 is formed by a MBE process or a MOCVD process. In this process, a deposition of InP is conducted on the InP substrate 17 to form the clad layer 16 and the confinement layer 12 of InGaAsP successively. Next, the deposition of an InGaAsP layer 1a having a composition of $In_{0.81}Ga_{0.19}As_{0.4}P_{0.6}$ in correspondence to the barrier region 21 and the deposition of an InGaAs layer 1b having the composition of $In_{0.53}Ga_{0.47}As$ in correspondence to the quantum well box, are repeated alternately to form the structure shown in FIG. 8(A), wherein FIG. 8(A) is an enlarged view of a layered body $1_A$ that corresponds to the active region 1 under construction. During this process, one may change the interval of deposition of each of the layers 1b gradually as illustrated. In correspondence to this, the thickness of the layer 1b changes from about 15 nm to 25 nm. On the other hand, the thickness of the layer 1a may be set to about 15 nm. The deposition may be achieved by the conventional MBE or MOCVD process and repeated for about 8 times, for example.

Figure 8B:
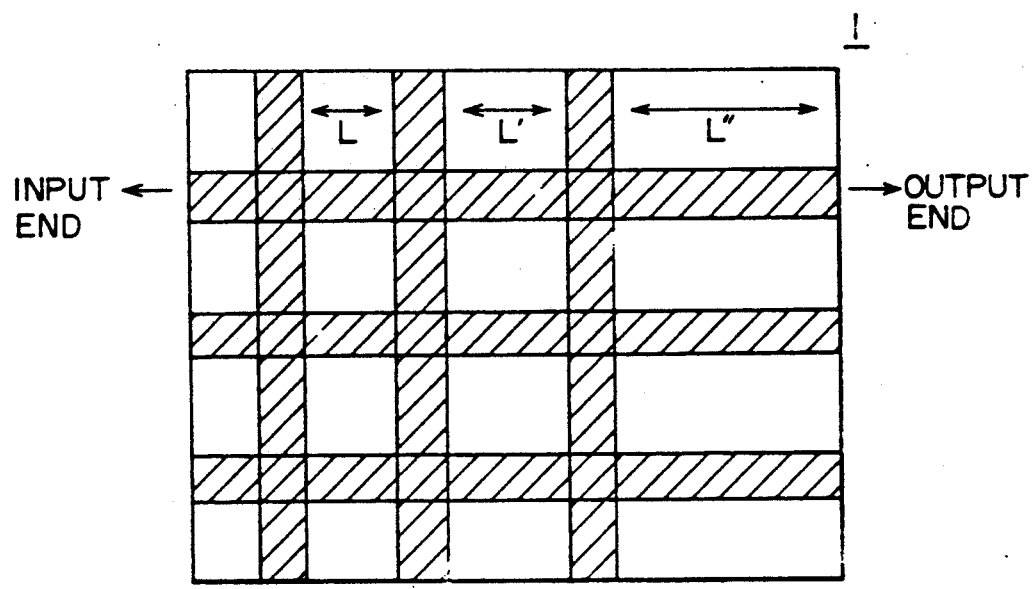

After the structure of FIG. 8(A) is thus formed, a patterning process to form the quantum well box 21 is conducted as shown in FIG. 8(B).

Referring to FIG. 8(B) showing the plan view of the layered body $1_A$ obtained in the step of FIG. 8(A), an electron beam resist E is applied on the upper major surface of the layered body 10 and patterned subsequently by an electron beam. Thereby, a number of bands are exposed as shown by the hatching with a width of about 15 nm such that the bands form a grid pattern. There, the pitch of the grid is changed gradually from the input end to the output end as represented by L, L', L'', ..., typically from 15 nm to 25 nm. The lateral pitch of the bands may be set at about 15 nm.

Figure 8C:
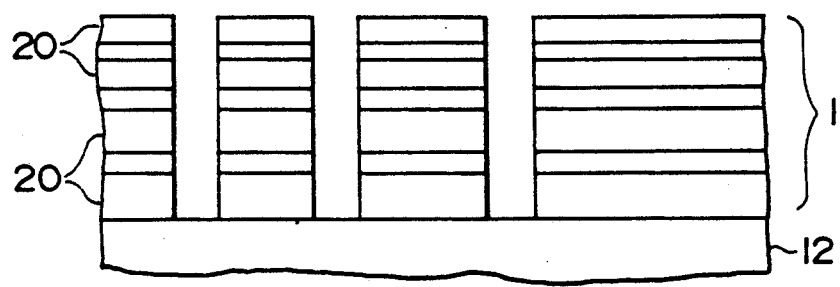

After the patterning of FIG. 8(B) is achieved, the layered body $1_A$ of FIG. 8(A) is subjected to an RIE process while using the patterned electron beam resist as a mask as shown in FIG. 8(C). There, a number of grooves are formed in correspondence to the grid pattern of FIG. 8(B) to extend vertically until the InGaAsP layer 12 is exposed. Such a selective etching process may be achieved by using an etching gas of $Cl_2$. As a result of the etching, the layers $1b$ as well as the layers $1a$ are divided into a number of isolated regions, and the isolated quantum well boxes 20 of FIG. 2 is obtained. Alternatively to the combination of the electron beam exposure process and RIE process, one may use the electron beam writing and milling process as reported by Temkin et al., Appl. Phys. Lett. 50(7), Feb. 16, 1987, which is incorporated herein as reference.

Figure 8D:
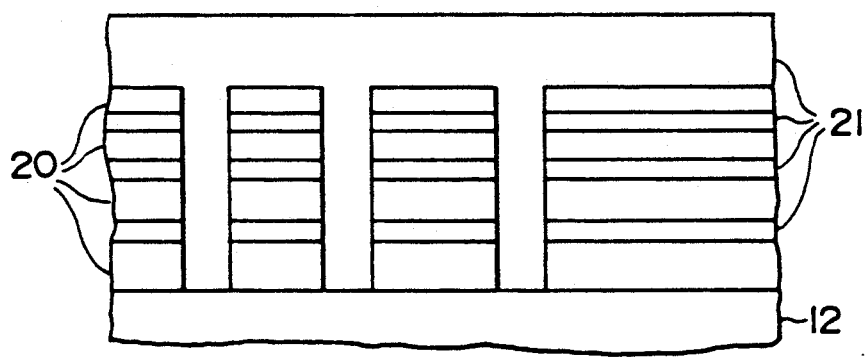

Next, in the step of FIG. 8(D), the grooves of FIG. 8(C) are filled by InGaAsP having the composition of $In_{0.81}Ga_{0.19}As_{0.4}P_{0.6}$ corresponding to the composition of the barrier region 21, and the quantum well box structure of FIG. 2 is obtained.

On the structure of FIG. 8(D), the InGaAsP confinement layer 11 and the clad layer 15 are grown as usual by the MBE or MOCVD process. Further, the antireflection coatings are provided on the input end and the output end as well as on the upper major surface of the clad layer 15, and the fabrication of the device of FIG. 1 is completed.

Next, a second embodiment of the present invention will be described with reference to FIGS. 9(A) -9(E).

Figure 9A:
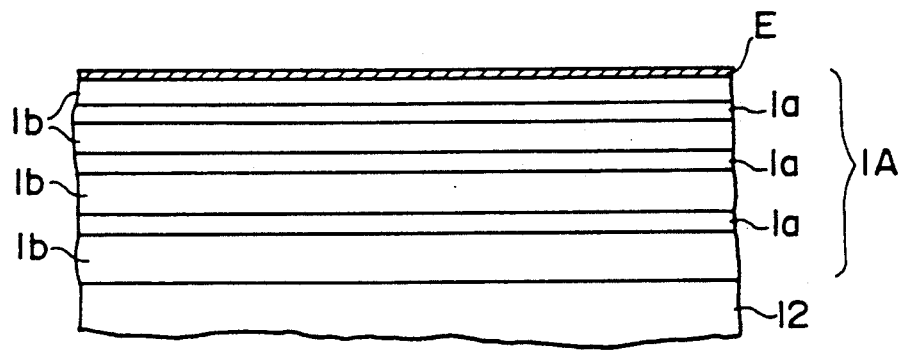
FIGS. 9(A)–9(E) are diagrams showing the process for fabricating the optical bandpass filter according to a second embodiment of the present invention.

Referring to FIG. 9(A) showing a structure substantially identical with the structure of FIG. 8(A), the layered body $1_A$ is grown on the InP substrate 17 by the MBE or MOCVD process as already described. On the top surface of the layered body $1_A$ thus formed, an electron beam resist E is provided similarly to FIG. 8(A).

Figure 9B:
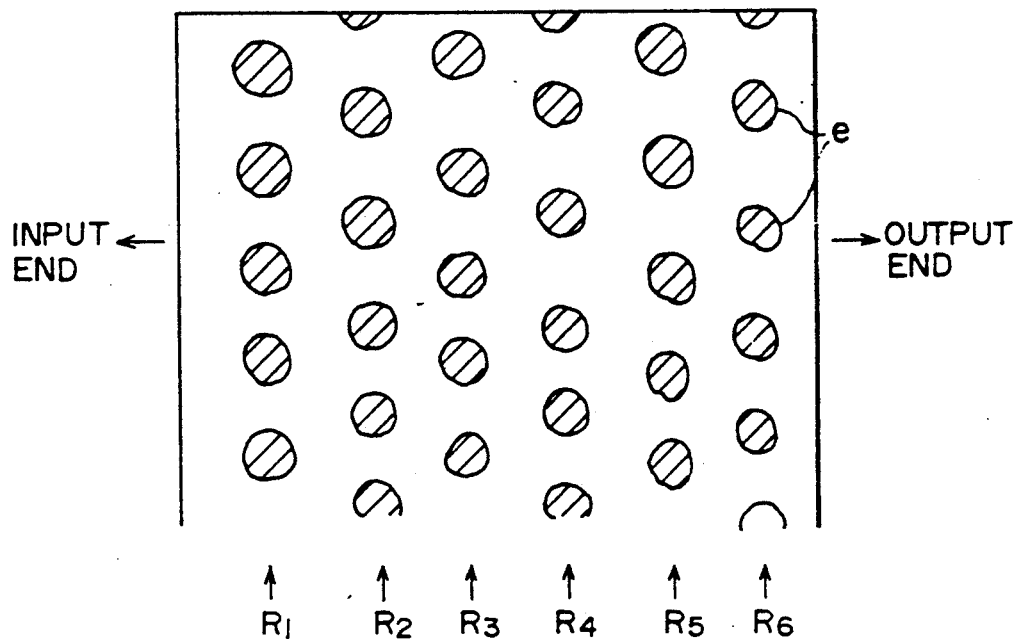

Next, the electron beam resist E is patterned by an electron beam exposure process to form a number of discs or dots e as shown in FIG. 9(B). Typically, each dot e has a diameter of 30 nm and formed into a number of rows $R_1$-$R_6$ extending perpendicularly to the path of the optical beam propagating from the input end to the output end, wherein the dots in each row are offset with respect to the dots in the adjacent rows in the extending direction of the dots. For example, the dots in the row $R_2$ are offset vertically in FIG. 9(B) with respect to the dots in the row $R_1$ or $R_3$. When viewed from the front end or rear end, one can see the dots of the electron beam resist overlap with each other.

Figure 9C:
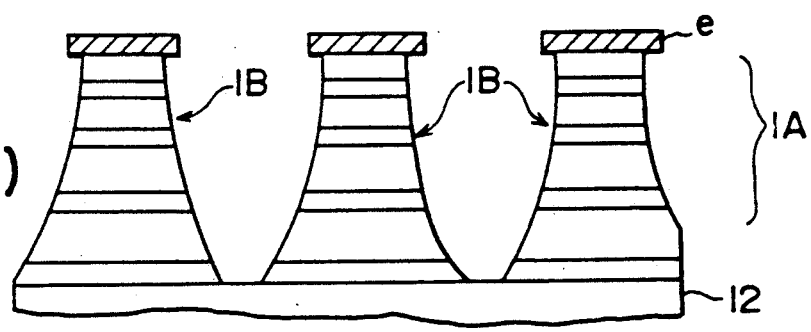
Figure 9D:
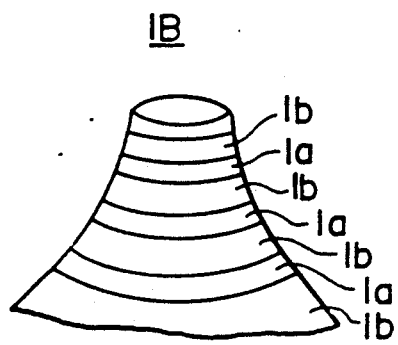

Next, in the step shown in FIG. 9(C), the layered body $1_A$ is subjected to an isotropic etching process while using the dots of FIG. 9(B) as the mask until the InGaAsP confinement layer 12 is exposed. Thereby, a number of generally conical structures $1_B$ are formed in the layered body $1_A$ to extend in the direction vertical to the upper major surface of the layer 12. See the perspective view of FIG. 9(D) that shows one of such conical structures. Thereby, each of the layers $1_b$ are isolated from each other and form a region corresponding to the quantum well box 20.

Next, a layer of InGaAsP having the composition of $In_{0.81}Ga_{0.19}As_{0.4}P_{0.6}$ in correspondence to the barrier region 21 is deposited on the structure of FIG. 9(C) by an MBE or MOCVD process, after removing the mask e, to bury the conical structures $1_B$. Thereby, the active structure 1 is completed as shown in FIG. 9(E).

In the structure of the present embodiment, the quantum well boxes in the structure $1_B$ are packed densely. Thereby, the device length can be reduced for example from 1 mm to 700 µm.

Figure 9E:
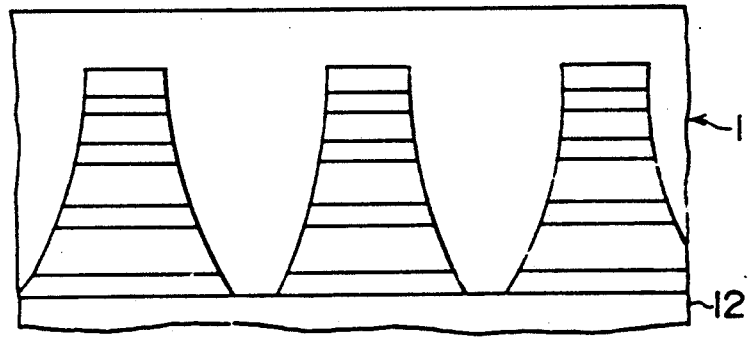

It should be noted that the active structure 1 of FIG. 9(E) has a disc-shaped quantum box. Even in such a case, discrete quantum levels appear with the energy level represented approximately as $$E_{1mn}=\hbar^2/2m^*\cdot(1\pi/L_z)^2+\hbar^2/2m^*\cdot(k_{mn}/R)^2$$

where l = 1, 2, 3, ..., m = 1, 2, 3, ..., n = 0, 1, 2, 3, ..., and R represents the radius of the conical patterns $1_B$ and hence the diameter of the quantum box 20, while $L_z$ represents the thickness of the quantum box 20. On the other hand, $k_{mn}$ represents the m-th solution of the equation $$J_n(x)=0,$$

where Jn is the Bessel function of the first kind of the order n.

From this equation, it will be understood that the quantum level $E_{1mn}$ increases with decreasing size of $L_z$ and R. As the diameter R changes in each conical pattern $1_B$ from the bottom part to the top part, and as the thickness of the quantum box 20 is decreased from the bottom part to the top part of the conical structure $1_B$, there appears a number of absorption peaks corresponding to the quantum boxes. Thereby, the absorption spectrum of FIG. 4 is obtained. By using the active structure 1 of this embodiment, too, one obtains the control of the passband wavelength of the optical bandpass filter.

Figure 10:
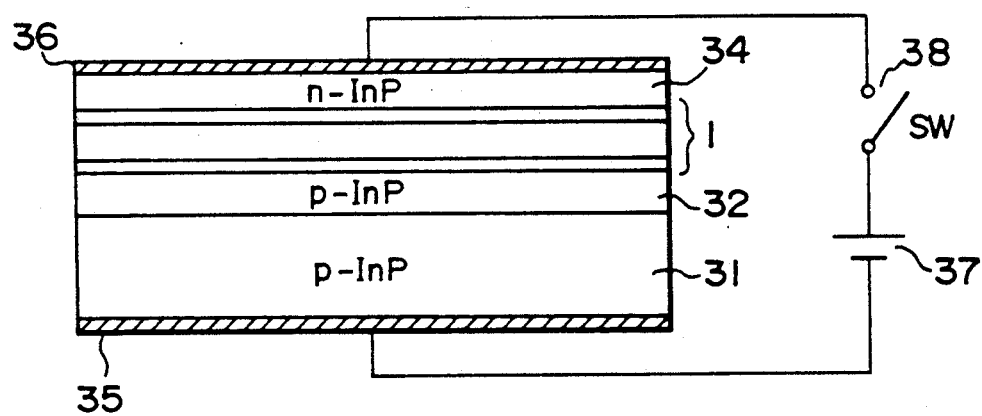
FIG. 10 is a diagram showing a third embodiment of the present invention.

FIG. 10 shows a third embodiment of the present invention, wherein the substrate as well as the clad layers are doped to apply an electric field across the active structure such that the carriers that are excited in the quantum well box are dissipated quickly. By dissipating the carriers as such, one can recover the initial optical state quickly and the selection of the passband wavelength is achieved in a short time period. Otherwise the carriers tend to remain in the excited state and the optical bandpass filter continues showing the passage of the optical beam of the selected wavelength even after the control optical beam is eliminated.

Referring to FIG. 10, a p-type substrate 31 of InP is used in place of the semi-insulating substrate 17. On the substrate 31, a clad layer 32 of p-type InP is provided in place of the undoped clad layer 16. Further, a clad layer 34 of n-type InP is provided on the active region 1 in place of the undoped clad layer 15. Further, an electrode 35 is provided at the bottom of the substrate 31 and a transparent electrode 36 is provided on the top surface of the clad layer 15. Further, a d.c. bias voltage is applied across the electrodes 35 and 36 by a d.c. voltage source 37 via a switch SW with a polarity to cause a reverse biasing in the structure of FIG. 10. Alternatively, one may provide a window on the electrode 36.

In operation, the switch SW is closed in response to each interruption of the control optical beam to apply the reverse bias voltage. In response thereto, the electrons and holes that are excited by the control optical beam are removed, and the active region 1 resumes the opacity against the incident optical beam.

The active region 1 that includes therein a number of quantum boxes with different absorption peaks can be constructed also by other combination of the semiconductor materials. For example, one may use undoped GaAs for the quantum box 20 and undoped AlGaAs for the barrier region 21. In this case, a GaAs substrate has to be used. Alternatively, one may use undoped AlGaInAs for the quantum box 20 and undoped AlInAs for the barrier region 21. Further, one may use undoped GaSb for the quantum box 20 and undoped AlGaSb for the barrier region 21. Further, the quantum box 20 may be formed by dispersing semiconductor particulates in a glass. For example, the particulates of CdSe may be dispersed in a silicate glass matrix to form the quantum well boxes. In such a case, the size distribution of the CdSe particles case the desired apparently continuous absorption spectrum shown in FIG. 4.

Further, the present invention is not limited to the embodiments described heretofore, but various variations and modifications may be made without departing from the scope of the invention.

What is claimed is:

1. An optical bandpass filter supplied with an incident optical beam including therein a plurality of optical components with respective wavelengths that differ from each other, for selectively passing a specified optical component having a specified wavelength, comprising:

a waveguide region having upper and lower major surfaces and extending from an input end to an output end for guiding the optical beam supplied to said input end, from said input end to said output end;

a clad structure provided above and below the waveguide region for confining the optical beam in said waveguide region;

a plurality of quantum well boxes formed in the waveguide region with respectively different quantum levels, said quantum well boxes comprising a material having a first band gap and defined by a boundary for all of the three-dimensional directions, said quantum well boxes having a variety of sizes in at least one of said three-dimensional directions, for selectively absorbing the optical components in the incident optical beam that causes a resonance with the quantum level of the quantum well box;

a barrier region provided in said waveguide region for surrounding each of the plurality of quantum well boxes with respect to all of three-dimensional directions, said barrier region comprising a material having a second band gap that is substantially larger than said first band gap; and window means provided on the clad structure for directing a control optical beam such that the control optical beam irradiates the plurality of quantum well boxes.

2. An optical bandpass filter as claimed in claim 1 in which said quantum well boxes have a generally rectangular form and arranged into a plurality of rows each extending in a direction of passage of the optical beam through the waveguide region, wherein the size of the quantum well boxes is changed, in each row, from the input end to the output end.

3. An optical bandpass filter as claimed in claim 1 in which said row of the quantum well boxes includes a number of quantum well boxes that are stacked in a direction perpendicular to said upper and lower major surfaces of the waveguide region with respective thicknesses, said thickness of the quantum well boxes being changed successively from the lower major surface to the upper major surface of the waveguide region.

4. An optical bandpass filter as claimed in claim 1 in which said quantum well boxes have a discform with variety of diameters.

5. An optical bandpass filter as claimed in claim 1 in which said quantum well boxes are arranged into a number of columns each extending in the waveguide region in a direction perpendicular to a direction of passage of the optical beam from the input end to the output end, said plurality of columns being disposed consecutively in the waveguide region in said direction of passage of the optical beam, each column including a number of quantum well boxes, wherein the quantum well boxes in one column are displaced with respect to the quantum well boxes of other columns in an elongating direction of the column.

6. An optical bandpass filter as claimed in claim 1 in which said clad structure comprises a first clad layer provided above the waveguide region and a second clad layer provided below the waveguide region, wherein said window means comprises an anti-reflection coating provided on an upper major surface of the first clad layer.

7. An optical bandpass filter as claimed in claim 1 in which said first clad layer is doped to a first conductivity type, while said second clad layer is doped to a second, different conductivity type.

8. An optical bandpass filter as claimed in claim 7 further comprising biasing means for applying a reverse bias voltage across said first and second clad layers.

9. An optical bandpass filter as claimed in claim 8 in which said biasing means comprises a d.c. voltage source for producing the bias voltage, a first electrode provided on an upper major surface of the first clad layer, a second electrode provided on a lower major surface of the second clad layer, interconnection means for applying the bias voltage across the first and second electrodes to cause a reverse biasing between the first and second clad layers, and a switch provided on said interconnection means for applying said bias voltage across the first and second electrodes, wherein the first electrode passes the incident optical beam.

\* \* \* \* \*

UNITED STATES PATENT AND TRADEMARK OFFICE
CERTIFICATE OF CORRECTION

PATENT NO. : 5,182,788
DATED : January 26, 1993
INVENTOR(S) : Kazuhiro TANAKA

It is certified that error appears in the above-indentified patent and that said Letters Patent is hereby corrected as shown below:

Col. 3, lines 52-53, in the equation, change "n²" and "h²" to --$\hbar^2$--; the resulting equation should read as follows:

$$E_{lmn} = \hbar^2/2m^* \cdot (l\pi/L_x)^2 + \hbar^2/2m^* \cdot (m\pi/L_y)^2 + \hbar^2/2m^* \cdot (n\pi/L_z)^2$$

Col. 4, line 31, change "BY" to --By--.

Col. 5, line 51, after "and" insert --is--.

Col. 7, line 22, change "case" to --cause--.

Col. 8, line 21, after "with" insert --a--.

Signed and Sealed this

Fourteenth Day of June, 1994

Attest:

BRUCE LEHMAN

*Attesting Officer*  *Commissioner of Patents and Trademarks*